Dec. 3, 1968 P. C. AUGUSTINE, JR 3,413,931
FREIGHT BRACING DEVICE
Filed Oct. 21, 1966 3 Sheets-Sheet 1
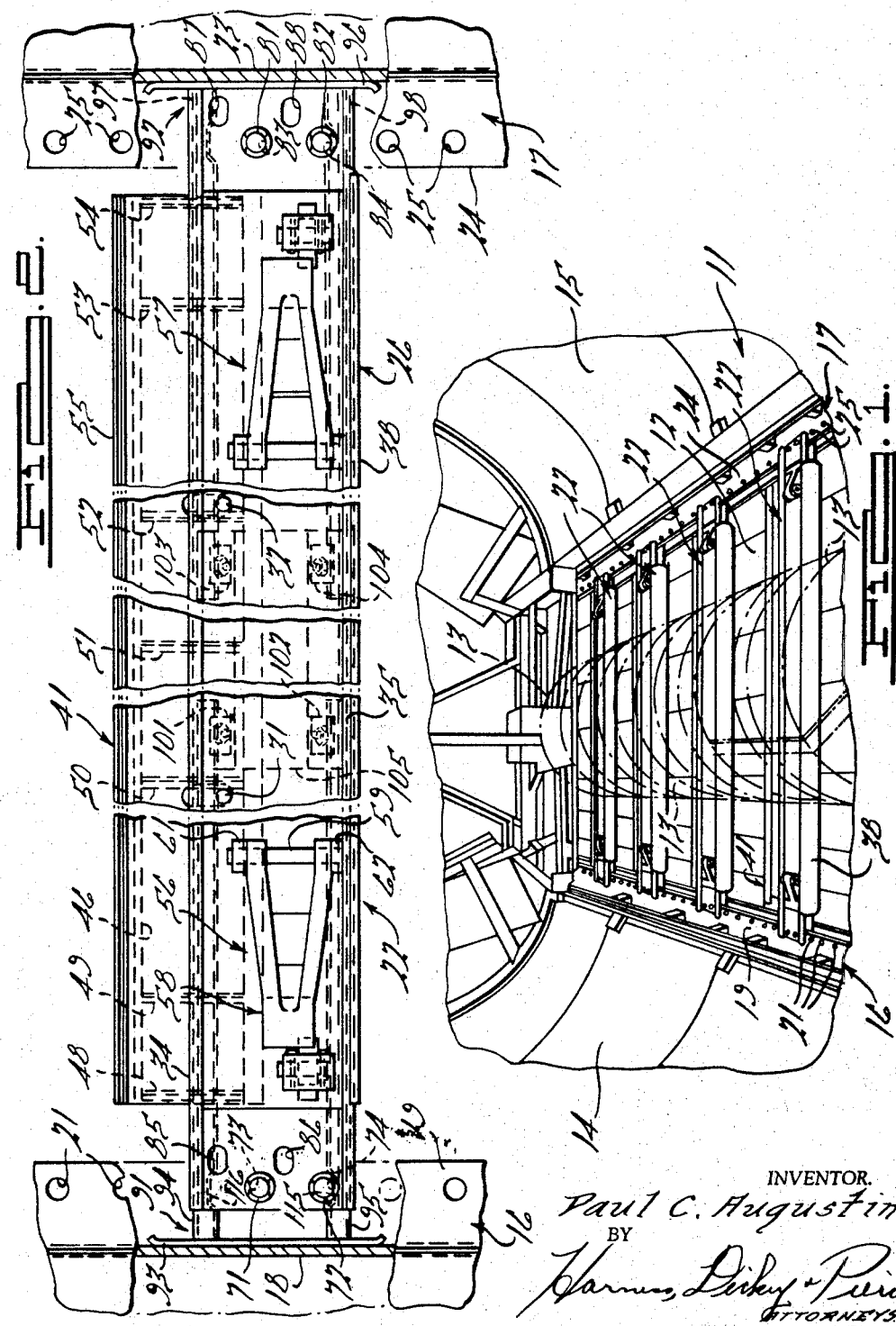
INVENTOR.
Paul C. Augustine, Jr.
BY
Harness, Dickey & Pierce
ATTORNEYS

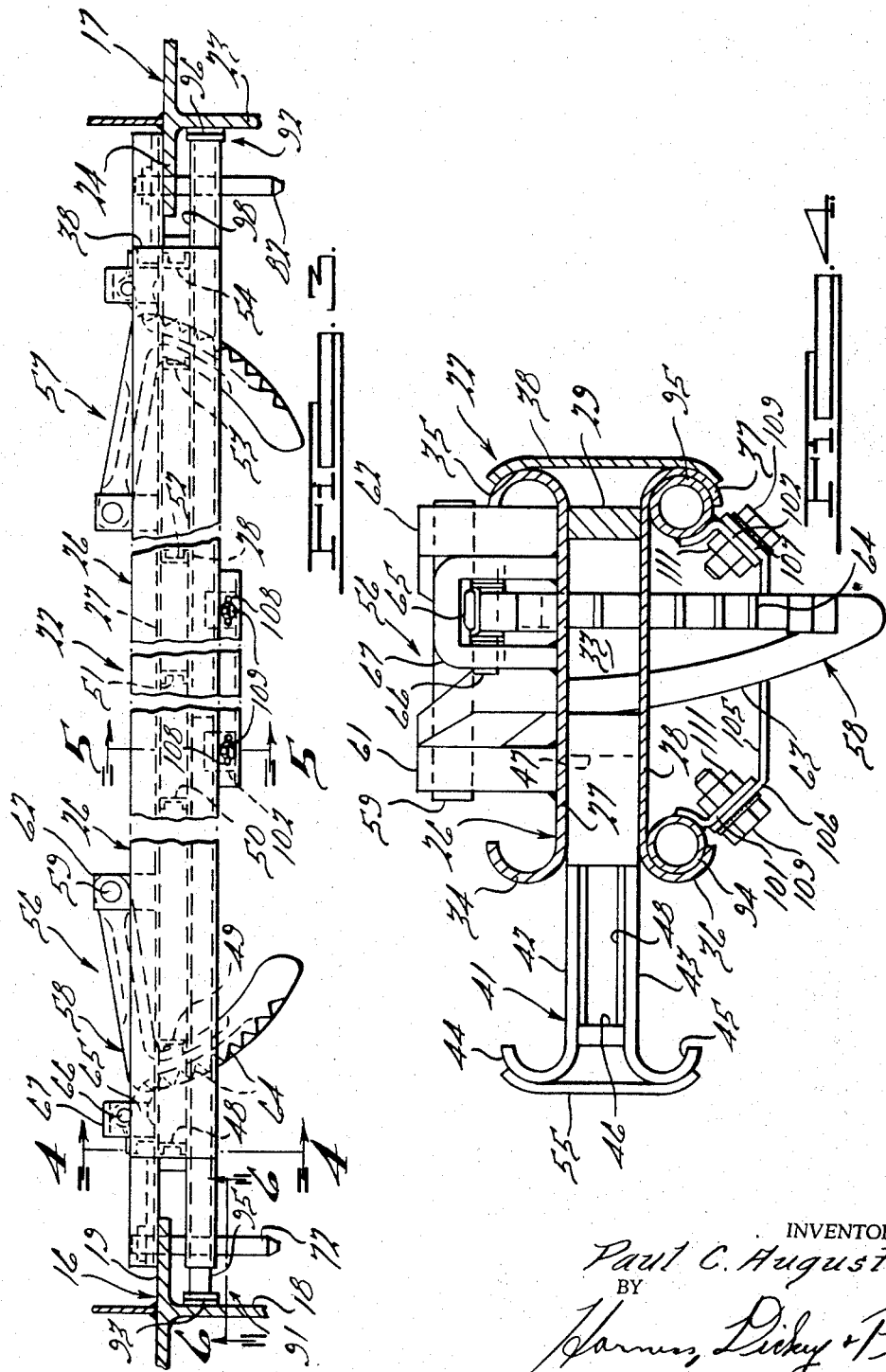

Dec. 3, 1968
P. C. AUGUSTINE, JR
3,413,931
FREIGHT BRACING DEVICE
Filed Oct. 21, 1966
3 Sheets-Sheet 3
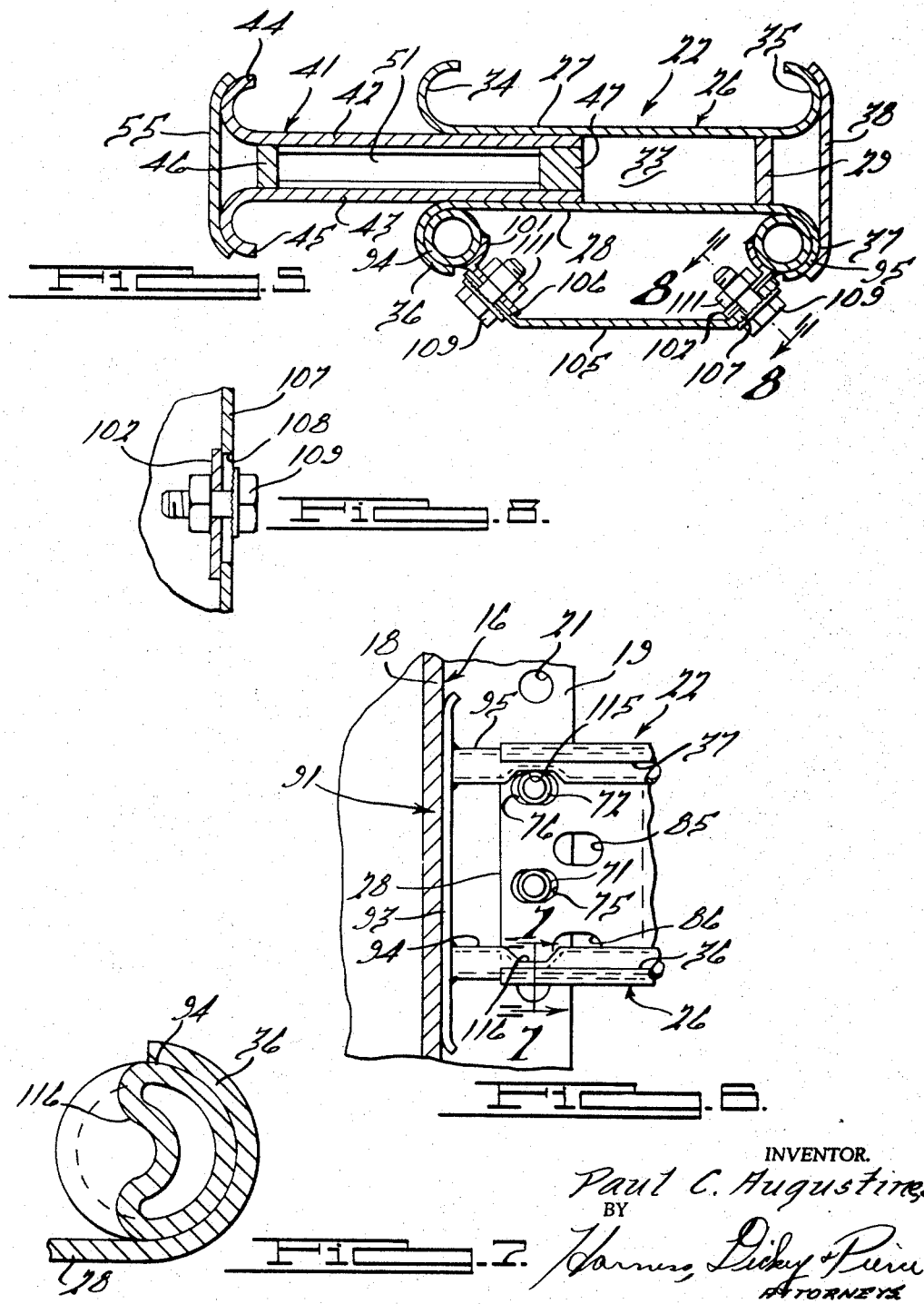
INVENTOR.
Paul C. Augustine, Jr.
BY
Harness, Dickey & Pierce.
ATTORNEYS United States Patent Office 3,413,931
Patented Dec. 3, 1968

3,413,931
FREIGHT BRACING DEVICE
Paul C. Augustine, Jr., Plymouth, Mich., assignor to Evans Products Company, a corporation of Delaware
Filed Oct. 21, 1966, Ser. No. 588,360
1 Claim. (Cl. 105—369)

ABSTRACT OF THE DISCLOSURE

A railway car for carrying coiled sheet steel and including a lightweight crossbar assembly for bracing the coils during transit. The crossbar assembly is automatically adjusted for width and has a lightweight construction due to its employment of formed metal plates.

This invention relates to a freight bracing device of the crossbar type and more particularly to an improved, high strength, lightweight crossbar assembly.

The copending patent application of Harvey W. Chapman and Herbert E. Rolfe, Jr., entitled "Freight Bracing Apparatus," Ser. No. 405,937, filed Oct. 23, 1964, now Patent No. 3,307,497 and assigned to the assignee of this invention, illustrates a crossbar assembly for use in bracing coils of sheet metal or the like during transit. The crossbar assembly shown in that application also automatically adjusts as to width to compensate for shifting of the load during transit. That crossbar assembly is highly effective but is extremely heavy due to the tremendous loads encountered in transit. This high weight makes handling difficult and reduces the maximum useable load of the car in which the material is being shipped.

It is, therefore, a principal object of this invention to provide an improved, lightweight freight bracing crossbar assembly.

It is a further object of this invention to provide a crossbar assembly that is light in weight without any sacrifice in strength.

It is another object of the invention to provide an improved, lightweight, automatically adjustable crossbar assembly.

A freight bracing crossbar assembly embodying this invention is of the lightweight type and is adapted to engage freight positioned between a pair of facing cargo area walls. The crossbar is comprised of a body portion made up of two parallel elongated plates that are adapted to extend between the cargo area walls. Each of the plates has a rolled over portion extending along its entire length at each of its sides for adding stiffness to the plates in bending. The rolled over portions of each plate extend away from the rolled over portions of the other plate so as to further enhance the bending strength. The plates are affixed to each other at longitudinally spaced intervals. The crossbar assembly is completed by means carried at each end thereof for effecting a detachable connection to the respective cargo area wall.

Other objects and advantages of this invention will become more apparent as this description proceeds, particularly when considered in conjunction with the accompanying drawings, wherein:

FIGURE 1 is a perspective view of a portion of a railway car embodying this invention.

FIGURE 2 is an enlarged top plan view of a portion of the railway car shown in FIGURE 1, with portions broken away, and showing one of the freight bracing crossbars.

FIGURE 3 is a side elevational view of the mechanism shown in FIGURE 2.

FIGURE 4 is an enlarged cross-sectional view taken along the line 4—4 of FIGURE 3.

FIGURE 5 is an enlarged cross-sectional view taken along the line 5—5 of FIGURE 3.

FIGURE 6 is an enlarged cross-sectional view taken along the line 6—6 of FIGURE 3.

FIGURE 7 is an enlarged cross-sectional view taken along the line 7—7 of FIGURE 6.

FIGURE 8 is an enlarged cross-sectional view taken along the line 8—8 of FIGURE 5.

Referring now in detail to the drawings and in particular to FIGURE 1, a railway car particularly adapted to carry coils of sheet metal or the like is shown partially and is identified generally by the reference numeral 11. The railway car 11 is comprised of a body portion defining a generally trough shaped bed 12 in which coils of sheet metal or the like 13 may be supported. A pair of clam shell covers 14 and 15 are supported at opposite sides of the car body for pivotal movement from an open position, as shown in FIGURE 1 and wherein the coils 13 may be loaded or unloaded, and a closed position wherein they meet over the bed 12 and protect the transported coils 13. The portion of the car 11 thus far described may be considered to be substantially the same as that disclosed in the copending application of Harvey W. Chapman and Gilbert F. Oakley, entitled "Railway Car," Ser. No. 433,840, filed Feb. 9, 1965, and assigned to the assignee of this invention. Reference may be had to that application for specific details regarding the car construction.

Referring now in addition to the remaining figures, a pair of generally I-shaped side sills, indicated generally by the reference numerals 16 and 17, extend along opposite sides of the car 11 adjacent the bed 12. The side sill 16 is comprised of a web portion 18 terminating at its upper end in an integral flange 19 that extends toward the bed 12. A plurality of spaced apertures 21 are formed in the flange 19 to provide a means whereby a freight bracing crossbar assembly, indicated generally by the reference numeral 22, may be attached at selected longitudinally positions to the sill 16. In a like manner, the sill 17 is comprised of a vertically extending web 23 and inwardly extending flange 24 in which apertures 25 are formed for selective attachment of the respective end of the crossbar assembly 22.

The crossbar assembly 22 is made up of a first longitudinally extending body portion, indicated generally by the reference numeral 26, that is comprised of a pair of spaced plates 27 and 28 formed from ¾₆ inch thick steel. The plates 27 and 28 have sufficient length to span substantially the entire width of the bed 12 and are held in spaced relationship by a plate 29 (FIGURES 4 and 5) and guide pins 31 and 32, although a greater number of guide pins may be employed if desired. The spacing between the plates 27 and 28 provides a longitudinally extending gap 33 for a purpose which will become more apparent as this description proceeds. Although the plates 27 and 28 result in a low weight assembly, they do not provide any substantial strength in bending. For this reason, the plate 27 is formed with upwardly rolled edges 34 and 35 that extend substantially the full length of the plate 27. In a like manner, the plate 28 is formed with rolled edges 36 and 37 which also extend the full length of the plate 28. The rolled edges 34 and 35 extend in the opposite direction from the rolled edges 36 and 37 so as to give the maximum strength in bending. That is, the relationship of the rolled edges 34 and 35 to the rolled edges 36 and 37 insures a maximum moment of inertia for the crossbar body portion 26. If desired, a plate member 38 may be affixed to the rolled edges 35 and 37 to provide a freight engaging surface that is adapted to engage the adjacent coil 13. Alternatively, the rolled edges 35 and 37 themselves may directly engage the adjacent coil 13.

Telescopically received within the gap 33 is the shank of a second cross member body portion 41. The body portion 41 is also made up of a pair of spaced plates 42 and 43 that have oppositely directed rolled over portions 44 and 45 extending for their full length along one of their edges. The plates 42 and 43 are held in spaced relationship by longitudinally extending plates 46 and 47 and by transversely extending channels 48, 49, 50, 51, 52, 53 and 54. The channels 50 and 52 engage the oppositely facing sides of the pins 31 and 32, respectively, so as to preclude transverse movement between the crossbar body portions 26 and 41 while permitting telescopic movement of the body portion 41 with respect to the body portion 26. A freight engaging plate 55 may also be fixed to the rolled over edge portions 44 and 45 of the body portion 41 to engage the adjacent coil 13, or alternatively, the edge portions 44 and 45 may themselves directly engage the coil 13.

A pair of automatic adjusting devices 56 and 57 are provided at opposite ends of the crossbar assembly 22 to automatically urge the freight engaging surfaces 38 and 55 away from each other to compensate for any shift in the spacing between adjacent of the coils 13. Since each of the automatic adjusting devices 56 and 57 are identical in construction with the exception of being reversed one with respect to the other, only the device 56 will be described in detail. The device 56 comprises a pivoted wedging member 58 that is supported upon a pivot pin 59 that is fixed to the plate 27 by means of upstanding brackets 61 and 62. The wedging member 58 has an arcuately curved surface 63 (FIGURE 4) that is adapted to engage the adjacent edge of the crossbar body portion 41 and urge it outwardly with respect to the body portion 26 when the member 58 pivots in a counterclockwise direction as viewed in FIGURE 3. A plurality of serrations 64 are formed in the outer edge of the member 58, which serrations are adapted to be engaged by a spring biased pawl 65 that is pivotally supported upon a pivot pin 66 which is, in turn, affixed to the plate 27 by means of an inverted channel shaped member 67. The automatic adjusting devices 56 and 57 will not be described in further detail since they are specifically disclosed and claimed in the copending application of Harvey W. Chapman and Herbert E. Rolfe, Jr., entitled "Freight Bracing Apparatus," Ser. No. 405,937, filed Oct. 23, 1964, now Patent No. 3,307,497 and assigned to the assignee of this invention.

The outer end of the plate 27 adjacent the sill 16 is adapted to overlie the sill flange 19 (FIGURE 3) to provide vertical support for the crossbar assembly 22 upon the sill 16. In a like manner, the opposite end of the plate 27 overlies the sill flange 24 to provide vertical support for this end of the crossbar assembly 22. The respective ends of the plate 28 underlie the flanges 19 and 24 but are spaced slightly from it so as to prevent disengagement of the crossbar assembly 22 from the flanges 19 and 24 under the influence of vertical forces in an upward direction.

The end of the crossbar assembly 22 supported upon the sill 16 is affixed in selected longitudinally spaced positions by means of a pair of headed lock pins 71 and 72 that are adapted to extend through a selected pair of the apertures 21 in the sill flange 19. In addition, the pins 71 and 72 extend through apertures 73 and 74 formed in the plate 27 and elongated apertures 75 and 76 formed in the plate 28.

In a like manner, a pair of headed lock pins 81 and 82 extend through a selected pair of the apertures 25 in the sill flange 24. The lock pins 81 and 82 also extend through elongated apertures 83 and 84 formed in the plate 27 and like apertures formed in the plate 28. In addition to the apertures 73 and 74 and 83 and 84 in the plate 27 and the like apertures in the plate 28, a second pair of elongated apertures 85 and 86 and 87 and 88 are provided in the respective ends of the plate 27 and like apertures formed in the plate 28. The apertures 85 and 86 are offset slightly from the apertures 71 and 72 both longitudinally and transversely with the apertures 85 and 86 being displaced inwardly from the apertures 73 and 74. The apertures 87 and 88 are also offset longitudinally and transversely from the apertures 83 and 84. The apertures 87 and 88 are, however, displaced outwardly from the apertures 83 and 84. The described relationship between the respective apertures permits a finer adjustment in the longitudinal position of the crossbar assembly 22 depending upon which pair of apertures are used at the respective ends to fix the crossbar assembly to the respective sills 16 and 17. This construction is similar to that described in the copending application of Harvey W. Chapman and Herbert E. Rolfe, Jr., entitled "Freight Bracing Apparatus," Ser. No. 405,937, filed Oct. 23, 1964 and assigned to the assignee of this invention.

When the headed lock pins 71, 72, 81 and 82 are removed from the respective apertures, the crossbar assembly 22 will still be supported upon the side sill flanges 19 and 24 by the plate 27. The crossbar assembly 22 may be slid to any desired longitudinal position with respect to the car bed 12 along the flanges 19 and 24. The lightweight construction of the crossbar assembly 22 facilitates this adjustment. To insure free movement and to prevent the crossbar assembly 22 from cocking sideways during this sliding movement, guide assemblies, indicated generally by the reference numerals 91 and 92 are provided at each end of the crossbar assembly 22.

The guide assembly 91 is comprised of an elongated plate 93 that is juxtaposed to the side sill web 18 and provides a bearing area with it of substantial length as may be readily discerned from FIGURE 2. The plate 93 is carried at the outer end of a pair of tubular rods 94 and 95 that extend into and are supported by the rolled over edges 36 and 37 of the plate 28. In a like manner, the guide assembly 92 is comprised of an elongated plate 96 that provides a substantial bearing surface with the side sill web 23 and is carried by a pair of tubular members 97 and 98. The tubular members 97 and 98 are also supported within the rolled over edges 36 and 37 of the plate 28.

A pair of inwardly extending tangs 101 and 102 are affixed to the inner ends of the tubular members 94 and 95. In a like manner, a pair of tangs 103 and 104 are fixed to the tubular members 97 and 98. A plate 105 having upstanding edges 106 and 107 extends between the adjacent ends of the tubular members 94, 95, 97 and 98 and is provided with elongated slots 108 (FIGURE 8) through which bolts 109 pass. The bolts 109 also pass through circular apertures formed in the respective tangs 101, 102, 103 and 104 and nuts 111 are threaded onto each of the bolts 109 so as to fix the tubular members 94, 95, 97 and 98 to each other. The length of the slots 108 permits some adjustment to be made in the distance between the plates 93 and 96 so as to compensate for variations in spacing between the side sill webs 18 and 23.

As has been previously noted, a fine adjustment is permitted by the use of the staggered pairs of holes at the respective ends of the plates 27 and 28. During this adjustment, the crossbar assembly 22 is shifted transversely with respect to the car bed and hence the tubular members 94, 95, 97 and 98 must be slid with respect to the plate 28 so as to preserve the bearing engagement between the plates 93 and 96 and webs 18 and 23. As may be seen in FIGURES 6 and 7 the tubular members 94 and 95 are formed with indented portions 115 and 116, respectively, at their outer ends. The indented portion 115 is aligned with the aperture 96 when the crossbar assembly 22 is in one of its transverse positions and the indented portion 116 is aligned with the aperture 86 when the crossbar assembly 22 is in its other transverse position.

From the foregoing description, it should be readily apparent that a high strength, lightweight crossbar assembly has been provided that may be conveniently moved between selected longitudinal positions. Although the crossbar assembly has been described in conjunction with a railway car for transporting coils of sheet metal, other uses will suggest themself to those skilled in the art.

What is claimed is:

1. A lightweight freight bracing crossbar assembly adapted to engage freight positioned between a pair of facing cargo area walls; said crossbar assembly comprising a first body portion; said first body portion comprising a first pair of parallelly extending spaced elongated plates adapted to extend between the cargo area walls and defining a gap therebetween, each of said first pair of plates having rolled over portions extending along their length at each side thereof for adding stiffness to said plates in bending, the rolled over portions of each of said first pair of plates extending away from the other of said plates and away from said gap, means for affixing said first pair of plates together in said spaced relationship and a first bearing member affixed to the respective rolled over portions of said first pair of plates at one side thereof for providing a load engaging face at one side of said first body portion; a second body portion; said second body portion being comprised of a second pair of spaced elongated plates having rolled over portions at one of their respective sides, said rolled over portions of said second pair of plates extending away from each other, a second bearing member affixed to said rolled over portions of said second pair of plates for providing a load engaging face on said second body portion and means for affixing said second pair of plates to each other; said second pair of plates being slidably received in said gap of said first body portion with said rolled over portions of said second pair of plates and said second bearing member extending outwardly from said gap on the side of said first body portion opposite to said first bearing member; cooperating means on said first body portion and on said second body portion for guiding said sliding movement of said second body portion relative to said first body portion; means for adjusting the position of said second body portion relative to said first body portion for adjusting the spacing between the load engaging faces of said bearing members; and means carried at each end of said first body portion for effecting a detachable connection of said crossbar assembly to the respective cargo area wall.

References Cited

UNITED STATES PATENTS

| | | | |
|---|---|---|---|
| 2,887,963 | 5/1959 | Dunlap | 105—369 |
| 3,307,497 | 3/1967 | Chapman et al. | 105—369 |

DRAYTON E. HOFFMAN, *Primary Examiner.*